US011948493B2

(12) United States Patent
Park et al.

(10) Patent No.: US 11,948,493 B2
(45) Date of Patent: Apr. 2, 2024

(54) DISPLAY DEVICE AND METHOD FOR DRIVING THE SAME

(71) Applicant: Samsung Display Co., LTD., Yongin-si (KR)

(72) Inventors: Jong Hwan Park, Yongin-si (KR); Dae Cheol Kim, Yongin-si (KR); Kook Hyun Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/184,582

(22) Filed: Mar. 15, 2023

(65) Prior Publication Data

US 2024/0005832 A1 Jan. 4, 2024

(30) Foreign Application Priority Data

Jun. 29, 2022 (KR) ........................ 10-2022-0079963

(51) Int. Cl.
*G09G 3/20* (2006.01)

(52) U.S. Cl.
CPC ... *G09G 3/2007* (2013.01); *G09G 2320/0257* (2013.01); *G09G 2340/16* (2013.01); *G09G 2370/08* (2013.01)

(58) Field of Classification Search
CPC ......... G09G 3/2007; G09G 2320/0257; G09G 2340/16; G09G 2370/08
See application file for complete search history.

(56) References Cited

U.S. PATENT DOCUMENTS

| | | | | |
|---|---|---|---|---|
| 7,474,356 B2 | 1/2009 | Lee | | |
| 8,378,936 B2 | 2/2013 | Koh et al. | | |
| 2015/0097876 A1* | 4/2015 | Park | ..................... | G09G 3/3225 345/82 |
| 2020/0252532 A1* | 8/2020 | Shimokawa | ........... | H04N 23/72 |

FOREIGN PATENT DOCUMENTS

| | | |
|---|---|---|
| KR | 10-0487325 B1 | 5/2005 |
| KR | 10-0546593 B1 | 1/2006 |
| KR | 10-1467496 B1 | 12/2014 |

* cited by examiner

*Primary Examiner* — Priyank J Shah
(74) *Attorney, Agent, or Firm* — Lewis Roca Rothgerber Christie LLP

(57) ABSTRACT

A display device of the present disclosure comprises pixels arranged in a display, a data accumulator for accumulating first image data for an N-th frame output through the display, a data receiver for receiving second image data for an (N+1)th frame to be output through the display, and an afterimage controller for correcting a current value corresponding to a grayscale value of the second image data through a convolution operation between a filter, which is set based on the first image data, and the second image data.

18 Claims, 9 Drawing Sheets

DISPLAY DEVICE AND METHOD FOR DRIVING THE SAME

CROSS-REFERENCE TO RELATED APPLICATION

The application claims priority to, and the benefit of, Korean Patent Application No. 10-2022-0079963, filed Jun. 29, 2022, which is hereby incorporated by reference for all purposes as if fully set forth herein.

BACKGROUND

1. Field

The present disclosure relates to a display device and to a method for driving the same.

2. Discussion

In recent years, as interest in information displays increases, research and development on display devices are continuously being made.

SUMMARY

An aspect of the present disclosure is to provide a compensation method capable of compensating for a change in current-voltage characteristics of a driving transistor in a current image frame due to a previous frame.

Another aspect of the present disclosure is to reduce or prevent visual recognition of an afterimage otherwise occurring due to an increase in current consumption for a current frame due to a relatively high output luminance value in a previous frame.

However, aspects of the present disclosure are not limited to the above-described aspects, and may be variously extended without departing from the spirit and scope of the present disclosure.

A display device according to embodiments of the present disclosure may include pixels arranged in a display, a data accumulator for accumulating first image data for an N-th frame output through the display, a data receiver for receiving second image data for an (N+1)th frame to be output through the display, and an afterimage controller for correcting a current value corresponding to a grayscale value of the second image data through a convolution operation between a filter, which is set based on the first image data, and the second image data.

The first image data may include a grayscale value of the N-th frame, wherein the second image data includes a grayscale value of the (N+1)th frame.

A size of the filter may correspond to a number of previous frames, which include the N-th frame, in the first image data, wherein the filter is set based on the first image data and based on a parameter value that determines a degree for correcting the current value corresponding to the grayscale value of the second image data.

Data for the current value of the second image data corrected through the convolution operation may correspond to a first correction period including a section in which the current value is overcorrected, and corresponds to a second correction period distinct from the first correction period.

The first correction period may become longer as the size of the filter increases.

A degree to which the current value is overcorrected in the first correction period may be proportional to a magnitude of the parameter value.

A magnitude of the parameter value may be set so that a difference between the current value of the second image data that is corrected and a reference current value, which corresponds to the grayscale value of the second image data, is in a first range.

The first range may be less than or equal to about 1.5% of the reference current value.

When the grayscale value of the first image data and the grayscale value of the second image data are the same, the data for the current value of the second image data corrected might not correspond to the first correction period and the second correction period.

The degree to which the current value is overcorrected in the first correction period may increase as the grayscale value of the first image data increases.

A method for driving a display device according to embodiments of the present disclosure may include accumulating first image data for an N-th frame output through a display, receiving second image data for an (N+1)th frame to be output through the display, and controlling a current value corresponding to a grayscale value of the second image data by performing a convolution operation between a filter, which is set based on the first image data, and the second image data.

The first image data may include a grayscale value of the N-th frame, wherein the second image data includes a grayscale value of the (N+1)th frame.

The method may further include setting the filter based on a number of frames, which include the N-th frame, in the first image data, based on the first image data, and based on a parameter value indicating a degree to which the current value is corrected in response to the grayscale value of the second image data.

The method may further include setting the parameter value so that a difference between the current value of the second image data corrected, and a reference current value corresponding to the grayscale value of the second image data, is in a first range.

The first range may be less than or equal to about 1.5% of the reference current value.

Data for the current value of the second image data corrected may correspond to a first correction period including a section in which the current value is overcorrected, and a second correction period distinct from the first correction period.

The first correction period may become longer as a size of the filter increases.

A magnitude of the parameter value may be proportional to a degree to which the current value is overcorrected in the first correction period.

BRIEF DESCRIPTION OF THE DRAWINGS

The accompanying drawings, which are included to provide a further understanding of the embodiments of the present disclosure, and which are incorporated in, and constitute a part of, this specification, illustrate embodiments of the present disclosure, and, together with the description, serve to explain aspects of embodiments of the present disclosure.

DETAILED DESCRIPTION

Figure 1:
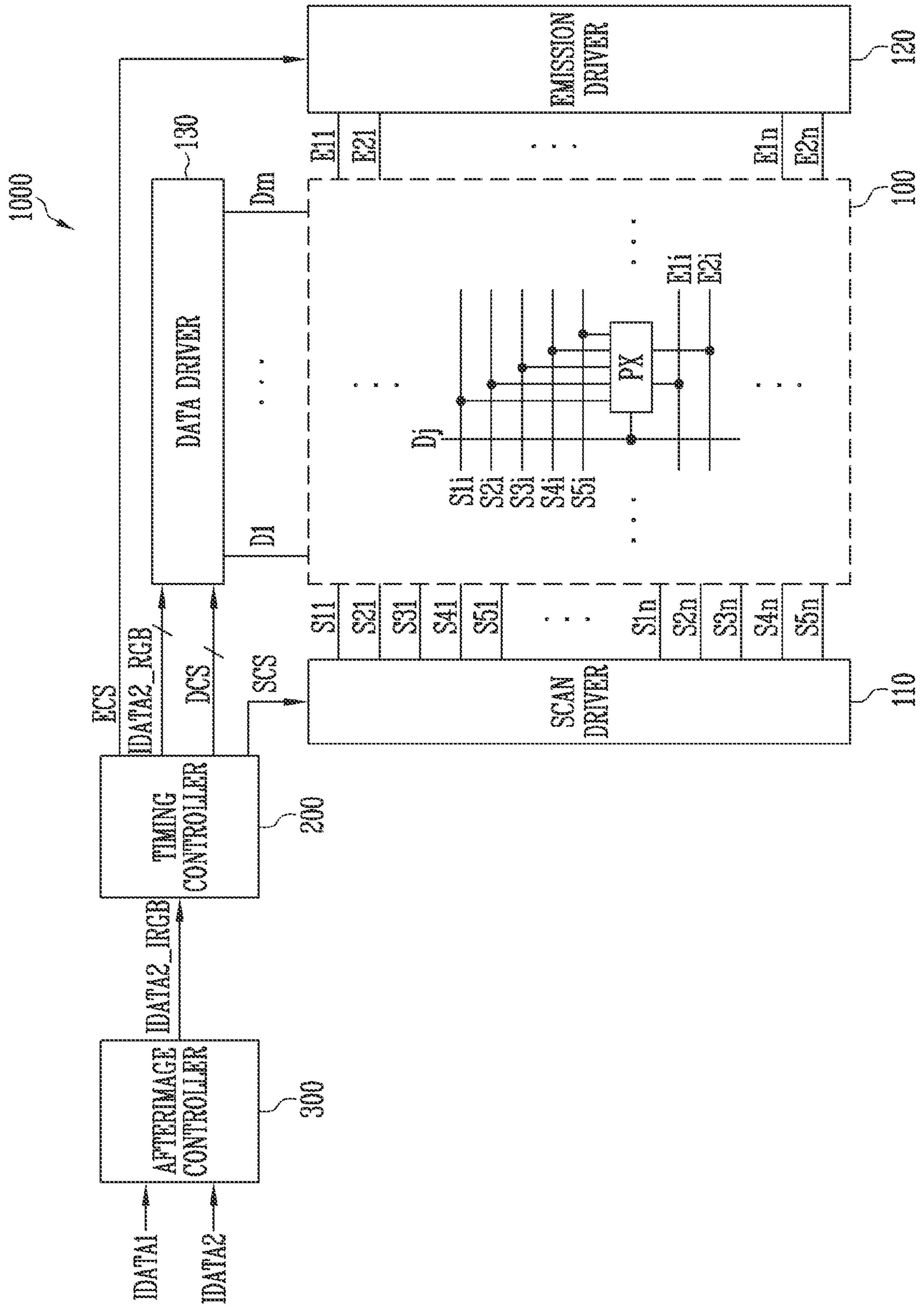
FIG. 1 is a block diagram illustrating a display device according to embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device 1000 according to embodiments of the present disclosure.

Referring to FIG. 1, the display device 1000 according to embodiments of the present disclosure may include a display (e.g., a pixel unit) 100, a scan driver 110, an emission driver 120, a data driver 130, a timing controller 200, and an afterimage controller 300.

The display device 1000 may display an image at various frame frequencies (refresh rate, driving frequency, or screen refresh rate) according to driving conditions. The frame frequency may mean a frequency (e.g., per second) at which a data signal is substantially written to a driving transistor of a pixel PX included in the display 100. For example, the frame frequency may also be referred to as a refresh rate or a screen refresh rate, and may indicate the frequency at which a screen is refreshed in one second.

In one or more embodiments, a data signal output frequency of the data driver 130, and/or an output frequency of a scan signal supplied to a scan line to supply the data signal, may be changed corresponding to the frame frequency. For example, the frame frequency for driving a moving image may be a frequency of about 60 Hz or higher (for example, about 60 Hz, about 120 Hz, about 240 Hz, about 360 Hz, about 480 Hz, or the like). In one example, when the frame frequency is about 60 Hz, a fourth scan signal may be supplied to each horizontal line (pixel row) 60 times per second.

In one or more embodiments, the display device 1000 may adjust output frequencies of the scan driver 110 and the emission driver 120 according to driving conditions. For example, the display device 1000 may display an image corresponding to various frame frequencies ranging from about 1 Hz to about 240 Hz. However, this is only an example, and the display device 1000 may display an image even with the frame frequency of about 240 Hz or higher (for example, about 300 Hz or about 480 Hz).

In one or more embodiments, the display 100 may include scan lines S11 to S1*n*, S21 to S2*n*, S31 to S3*n*, S41 to S4*n*, and S51 to S5*n*, emission control lines E11 to E1*n* and E21 to E2*n*, data lines D1 to Dm, and pixels PX connected thereto, where m and n may be integers greater than 1. Each of the pixels PX may include a driving transistor and a plurality of switching transistors.

In one or more embodiments, the timing controller 200 may receive input image data IDATA2_IRGB and control signals from a host system such as an application processor (AP) through an interface (e.g., a predetermined interface). The timing controller 200 may control driving timings of the scan driver 110, the emission driver 120, and the data driver 130.

In one or more embodiments, the timing controller 200 may receive the input image data IDATA2_IRGB from the afterimage controller 300.

In one or more embodiments, the timing controller 200 may generate a first control signal SCS, a second control signal ECS, and a third control signal DCS based on the input image data IDATA2_IRGB and the control signals. The first control signal SCS may be supplied to the scan driver 110, the second control signal ECS may be supplied to the emission driver 120, and the third control signal DCS may be supplied to the data driver 130. The timing controller 200 may rearrange the input image data IDATA2_IRGB to generate output image data IDATA2_RGB, and may supply the output image data IDATA2_RGB to the data driver 130.

In one or more embodiments, the scan driver 110 may receive the first control signal SCS from the timing controller 200, and may supply a first scan signal, a second scan signal, a third scan signal, a fourth scan signal, and a fifth scan signal to first scan lines S11 to S1*n*, second scan lines S21 to S2*n*, third scan lines S31 to S3*n*, fourth scan lines S41 to S4*n*, and fifth scan lines S51 to S5*n*, respectively, based on the first control signal SCS.

In one or more embodiments, the first to fifth scan signals may be set to a gate-on level voltage corresponding to the type of a transistor to which the scan signal is supplied. The transistor receiving the scan signal may be set to a turned-on state when the scan signal is supplied.

In one or more embodiments, the scan driver 110 may supply at least some of the first to fifth scan signals one or more times during a non-emission period. Accordingly, the bias state of the driving transistor included in the pixel PX may be controlled.

In one or more embodiments, the emission driver 120 may supply a first emission control signal and a second emission control signal to first emission control lines E11 to E1*n* and second emission control lines E21 to E2*n*, respectively, based on the second control signal ECS.

In one or more embodiments, the first and second emission control signals may be set to a gate-off level voltage (for example, a high voltage). A transistor receiving the first emission control signal or the second emission control signal may be turned off when the first emission control signal or the second emission control signal is supplied, and may be set to a turned-on state in other cases.

For convenience of description, although the scan driver 110 and the emission driver 120 are shown as separate components in FIG. 1, the present disclosure is not limited thereto. Depending on a design, the scan driver 110 may include a plurality of scan drivers that respectively supply at least one of the first to fifth scan signals. Also, parts of the scan driver 110 and the emission driver 120 may be integrated into one driving circuit, module, or the like.

In one or more embodiments, the data driver 130 may receive the third control signal DCS and the output image data IDATA2_RGB from the timing controller 200. The data driver 130 may convert the digital format output image data IDATA2_RGB into an analog data signal (or data voltage). The data driver 130 may supply the data signal to the data lines D1 to Dm in response to the third control signal DCS. In this case, the data signal supplied to the data lines D1 to Dm may be supplied to be synchronized with an output timing of the fourth scan signal supplied to the fourth scan lines S41 to S4*n*.

In one or more embodiments, in the display device 1000, when a previous image frame already output through the display 100 is a frame having a relatively high grayscale value (for example, a frame of a white pattern), a large amount of current may be applied to the driving transistor in response to data of the previous image frame, and thus heat may be generated in the display 100. A current flowing through the driving transistor of the pixel PX may increase due to heat generated in the display 100.

In one or more embodiments, in the display device 1000, as the current flowing through the driving transistor of the pixel PX increases due to the previous image frame, a luminance value of an image frame to be output after the previous image frame may also increase, and thus an afterimage may occur.

In one or more embodiments, the afterimage controller 300 may perform a convolution operation between a filter (for example, a filter 310 of FIG. 4) based on first image data IDATA1, which is the data for the previous image frame already output through the display 100, and second image data IDATA2 that is data for an image frame to be output through the display 100.

In one or more embodiments, the current value to be consumed by the second image data IDATA2 to be output through the display 100 may increase due to the current value increased by the first image data IDATA1 previously output through the display 100, but the afterimage controller 300 may reduce the current value to be consumed by the second image data IDATA2 through the convolution operation. That is, the afterimage controller 300 may generate the input image data IDATA2_IRGB for correcting the current value corresponding to the grayscale value of the second image data IDATA2 to be output by the display 100 through the convolution operation.

In one or more embodiments, the input image data IDATA2_IRGB may include data whose current value is controlled in response to the grayscale value of the second image data IDATA2 to be output through the display 100. In one example, the input image data IDATA2_IRGB may include data whose current value is corrected in response to the grayscale value of the second image data IDATA2 according to the current value increased by the data for the previous image frame.

For convenience of description, although the timing controller 200 and the afterimage controller 300 are shown as separate components in FIG. 1, the present disclosure is not limited thereto. Depending on a design, the afterimage controller 300 may be included in the timing controller 200, and the timing controller 200 and the afterimage controller 300 may be integrated into one driving circuit or module.

Figure 2:
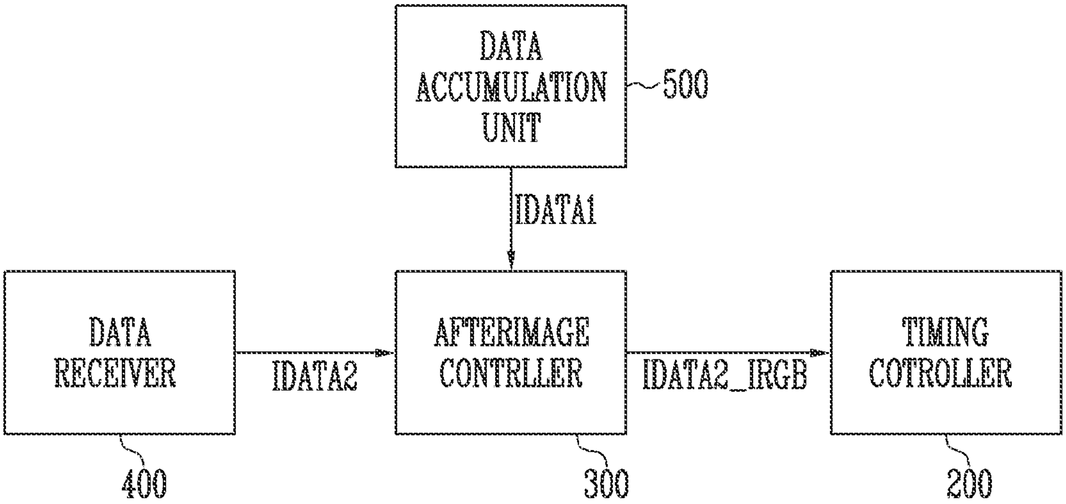
FIG. 2 is a diagram illustrating a configuration for correcting a current value corresponding to a grayscale value of second image data of FIG. 1.

FIG. 2 is a diagram illustrating a configuration for correcting a current value corresponding to a grayscale value of second image data IDATA2 of FIG. 1.

In one or more embodiments, a display device (for example, the display device 1000 of FIG. 1) may include a timing controller 200, an afterimage controller 300, a data accumulator (e.g., a data accumulation unit) 500, and a data receiver 400.

In one or more embodiments, the data accumulator 500 may store first image data IDATA1 output through a display (for example, the display 100 of FIG. 1). In one example, the data accumulator 500 may accumulate the first image data IDATA1 for each frame. In one example, the first image data IDATA1 may include image data for a previous frame including an N-th frame output through the display 100.

In one or more embodiments, the data receiver 400 may receive second image data IDATA2 to be output through the display 100. The data receiver 400 may store the second image data IDATA2 for each frame. The second image data IDATA2 may include image data for an (N+1)th frame to be output through the display 100.

In one or more embodiments, when the data receiver 400 receives the image data for the (N+1)th frame to be output through the display 100, the data accumulator 500 may store data for the N-th frame, which is a frame immediately preceding the (N+1)th frame.

In one or more embodiments, the afterimage controller 300 may receive the second image data IDATA2 from the data receiver 400. The afterimage controller 300 may receive the first image data IDATA1 from the data accumulator 500.

In one or more embodiments, the afterimage controller 300 may generate a convolution filter (for example, the filter 310 of FIG. 4) for a convolution operation based on the first image data IDATA1.

In one or more embodiments, the afterimage controller 300 may perform a convolution operation between the convolution filter generated based on the first image data IDATA1, and the second image data IDATA2.

In one or more embodiments, the afterimage controller 300 may perform the convolution operation between the convolution filter generated based on the first image data IDATA1 and the second image data IDATA2 to generate input image data IDATA2_IRGB for the second image data IDATA2. In one example, the input image data IDATA2_IRGB may include data for correcting a current consumption value corresponding to a grayscale value of the second image data IDATA2 to reduce an effect of current increased by the transistor due to the first image data IDATA1.

In one or more embodiments, the afterimage controller 300 may transmit the input image data IDATA2_IRGB to the timing controller 200. The timing controller 200 may convert the format of the input image data IDATA2_IRGB received from the afterimage controller 300 to meet interface specifications of a scan driver (for example, the scan driver 110 of FIG. 1), an emission driver (for example, the emission driver 120 of FIG. 1), and a data driver (for example, the data driver 130 of FIG. 1).

Figure 3:
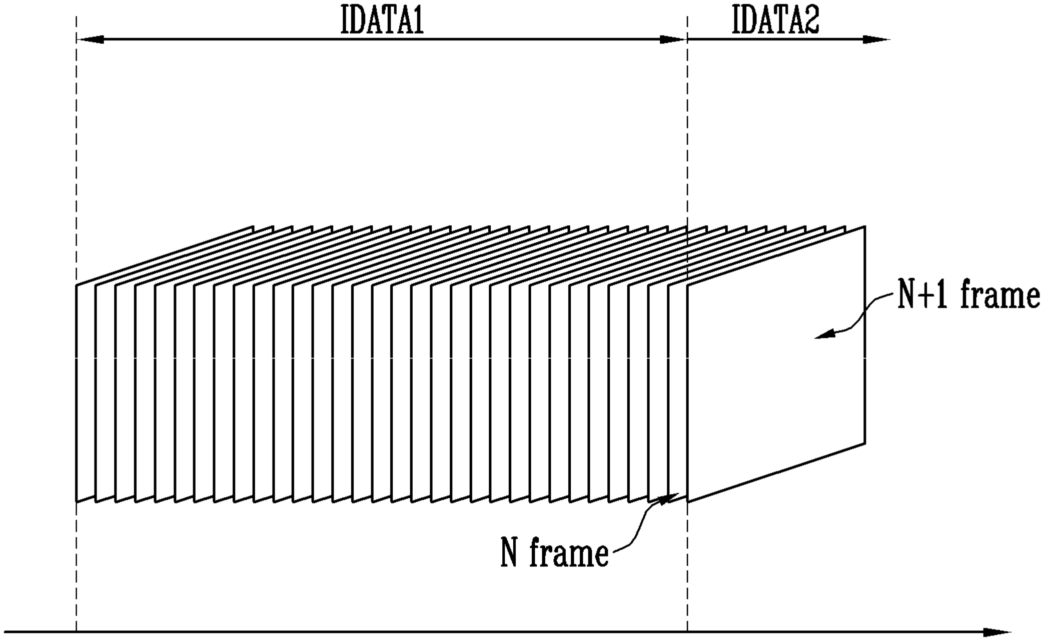
FIG. 3 is a diagram illustrating first image data and second image data of FIG. 1.

FIG. 3 is a diagram illustrating first image data IDATA1 and second image data IDATA2 of FIG. 1.

In one or more embodiments, the first image data IDATA1 may include data output through the display 100. In one example, the first image data IDATA1 may include image data for a previous frame including a frame output immediately before through the display 100 in units of frames. For example, the first image data IDATA1 may include image data output in units of 100 frames. In one example, the first image data IDATA1 may include data for each frame included within a unit time (e.g., a predetermined unit time). In one example, the first image data IDATA1 may be stored in a data accumulator (for example, the data accumulator 500 of FIG. 2).

In one or more embodiments, the second image data IDATA2 may include image data to be output through the display (for example, the display 100 of FIG. 1). In one example, the second image data IDATA2 may include image data to be output through the display 100 in units of frames. The second image data IDATA2 may include data to be output sequentially. In one example, the second image data IDATA2 may be stored in a data receiver (for example, the data receiver 400 of FIG. 2).

In one or more embodiments, the second image data IDATA2 may include the (N+1)th frame that is current frame data to be output through the display 100. The first image data IDATA1 may include data for a previous frame including the N-th frame that is frame data output immediately before through the display 100.

In one or more embodiments, as the data to be output through the display 100 is sequentially received by the data receiver 400, the first image data IDATA1 and the second image data IDATA2 may be updated.

Figure 4:
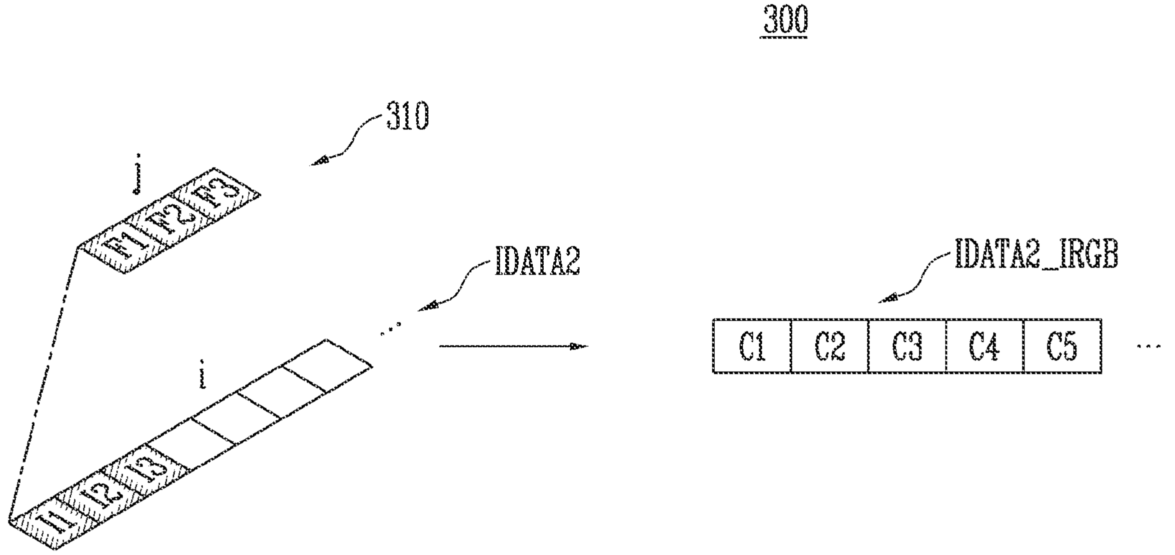
FIG. 4 is a diagram illustrating a convolution operation between a filter based on the first image data and the second image data.

FIG. 4 is a diagram illustrating a convolution operation between a filter 310 based on the first image data IDATA1 and the second image data IDATA2.

FIG. 4 shows an example of generating input image data IDATA2_IRGB by performing a convolution operation on the second image data IDATA2 using the filter 310.

In one or more embodiments, the second image data IDATA2 may include sequential data to be output through the display (for example, the display 100 of FIG. 1). In one example, the first image data IDATA1 may include data for i frames. Here, i may represent the number of frames output through the display 100 according to time t. The data for i frames may include a current value corresponding to a grayscale value (or luminance value) in each frame. The second image data IDATA2 may be represented by Ii, which is a matrix having a size of i×1 according to Equation 1 below.

$$Ii=[I1,I2,I3, \ldots ,Ii] \quad \text{Equation 1}$$

In one example, the afterimage controller 300 may generate the filter 310 based on the number of frames included in the first image data IDATA1, a current value corresponding to a grayscale value (or luminance value) of each frame included in the first image data IDATA1, and a parameter value that determines a degree for controlling a current value of the second image data IDATA2.

In one or more embodiments, the size of the filter 310 may be set based on the number of frames included in the first image data IDATA1. The first image data IDATA1 may include data for j frames. The data for j frames may include a grayscale value (or luminance value) of each frame, and may also include a current value corresponding thereto.

In one or more embodiments, the filter 310 may be represented by Fj, which is a matrix having a size of j×1 according to Equation 2 below. Here, j may be the number of frames of the first image data IDATA1.

$$Fj=[F1,F2,F3, \ldots ,Fj] \quad \text{Equation 2}$$

Each value included in the filter 310 may include a value in which the parameter value is reflected in the current value corresponding to the grayscale value (or luminance value) of each frame included in the first image data IDATA1.

In one or more embodiments, the parameter value may include a value that determines a degree for controlling the current value of the second image data IDATA2. As the parameter value increases, a degree to which the current value corresponding to the grayscale of the second image data IDATA2 is corrected may increase. In one example, the parameter value may vary according to the number of frames included in the first image data IDATA1, which is the size of the filter 310. For example, when the size of the filter 310 is 100, the parameter value may be $-6\ e^{-3}$.

In one or more embodiments, the afterimage controller 300 may generate the input image data IDATA2_IRGB by performing the convolution operation between the filter 310 and the second image data IDATA2. The input image data IDATA2_IRGB may include a current value for correcting a current to be consumed corresponding to the grayscale value of each frame included in the second image data IDATA2.

Referring to FIG. 3, in a convolution operation process, a multiplication operation may be performed on values for I1, I2, I3, . . . , and Ii, which are current values of each frame included in the second image data IDATA2, and on values for F1, F2, and F3 of the filter 310 (for example, when the size of the filter 310 is 3), respectively, and the input image data IDATA2_IRGB may be generated according to a combination of result values of the multiplication operation.

In one or more embodiments, the input image data IDATA2_IRGB may be determined according to Equation 3 below.

$$Ci=\sum_{j=-\infty}^{\infty} D_{i-j}\times F_j \qquad \text{Equation 3}$$

Referring to FIG. 3 and Equation 3, Ci may be the input image data IDATA2_IRGB expressed in a matrix form, and may be a value whose current level is scaled down according to the convolution operation between the filter 310 and the second image data IDATA2. For example, when the size of the filter 310 is 3, C1 of the input image data IDATA2_IRGB may be represented by **I1*F1+I2*F2+I3*F3 according to a multiplication operation between the filter 310 and I1, I2, and I3, which are the second image data IDATA2, and the filter 310**, and C2 may be represented by I2*F1+I3*F2+I4*F3 according to a multiplication operation between the filter 310 and D2, D3, and D4, which are the second image data IDATA2.

In one or more embodiments, when the grayscale value included in the data of the (N+1)th frame to be output of the second image data IDATA2 is the same as the grayscale value included in the data of the output N-th frame of the first image data IDATA1, and when a convolution operation between the filter generated based on the data for the N-th frame of the first image data IDATA1 and the data for the (N+1)th frame of the second image data IDATA2 is performed, the input image data IDATA2_IRGB may include a current value corresponding to the grayscale value of the (N+1)th frame of the second image data IDATA2 without correction for the current to be consumed corresponding to the grayscale value of the (N+1)th frame of the second image data IDATA2.

Figure 5A:
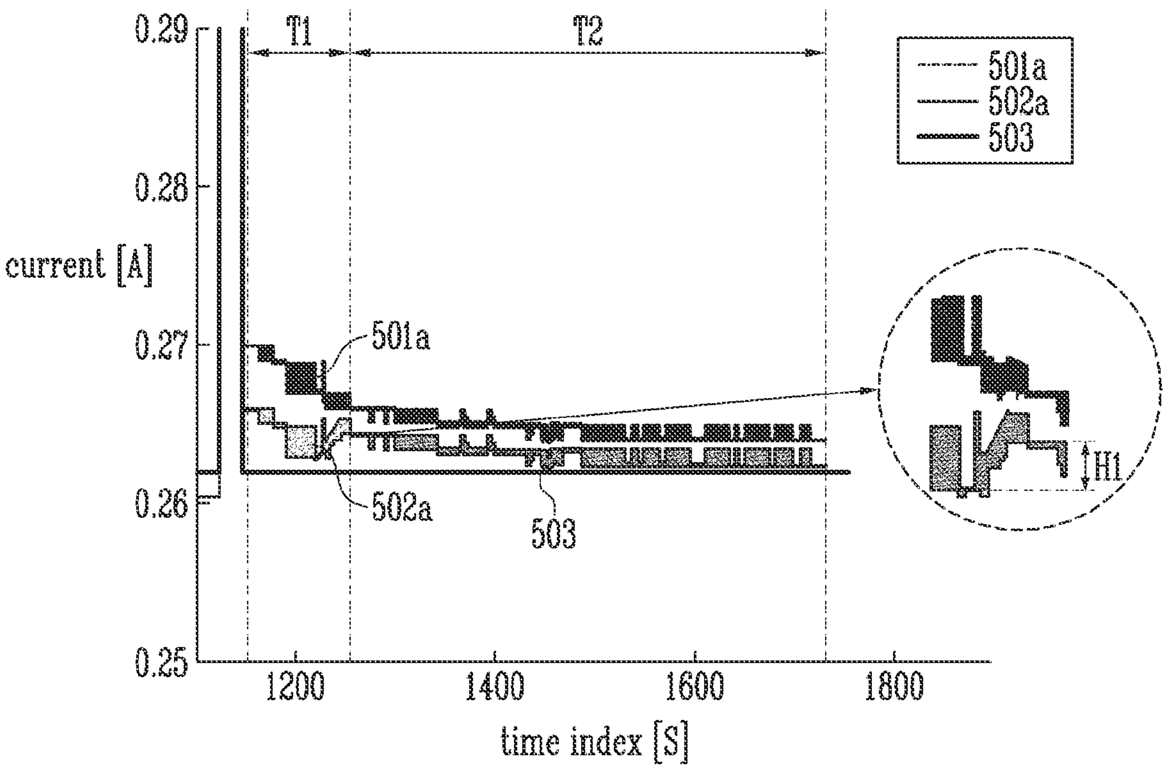
FIGS. 5A and 5B are diagrams illustrating corrected current consumption values for an (N+1)th frame of the second image data according to the convolution operation.
Figure 5B:
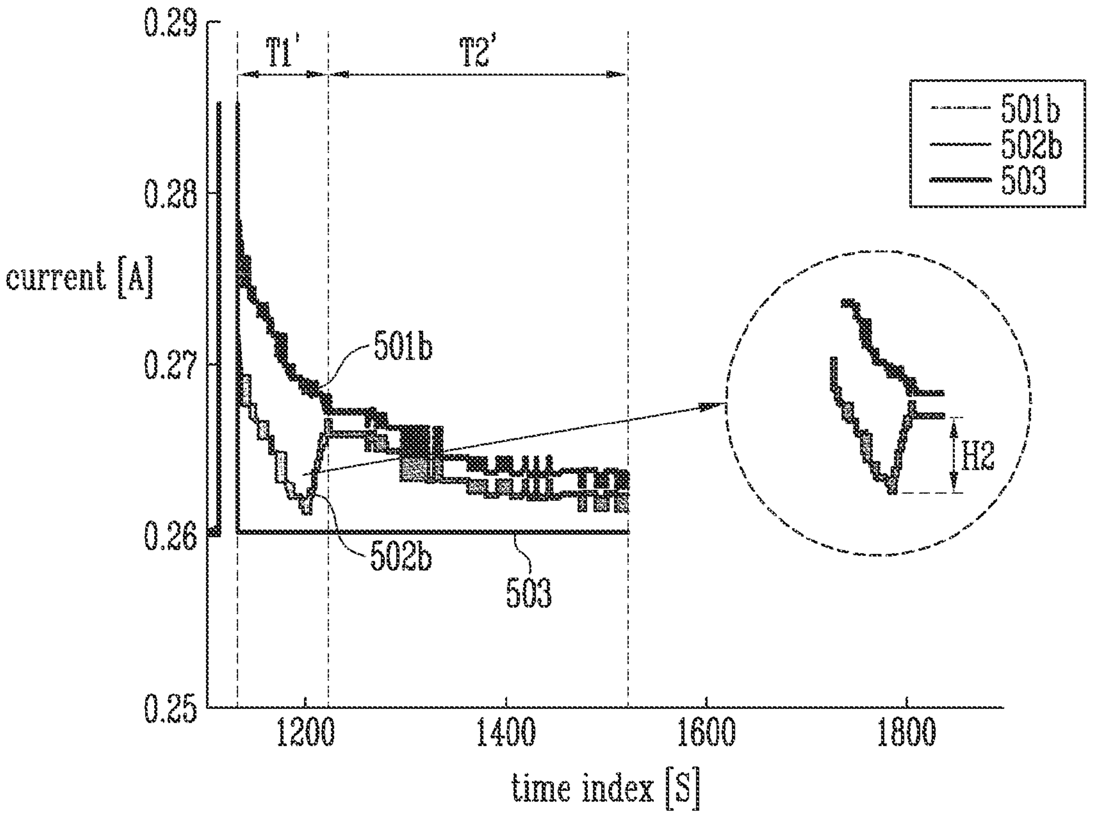

FIGS. 5A and 5B are diagrams illustrating corrected current consumption values for an (N+1)th frame of the second image data IDATA2 according to the convolution operation.

Referring to FIGS. 5A and 5B, a reference value 503 may be an ideal current value required to correspond to the grayscale value of the (N+1)th frame included in the second image data (for example, the second image data IDATA2 of FIG. 2).

Referring to FIGS. 5A and 5B, a first current value 501*a* and a second current value 502*a* assume that an output luminance value of the N-th frame included in the first image data (for example, the first image data IDATA1 of FIG. 2) is about 500 nits. A first current value 501*b* and a second current value 502*b* assume that an output luminance value of the N-th frame included in the first image data IDATA1 is about 1000 nits.

In one or more embodiments, the N-th frame of the first image data IDATA1 may have a grayscale value of 255 G (for example, a white pattern), and the (N+1)th frame of the second image data IDATA2 may have a grayscale value of 48 G.

In one or more embodiments, the first current value 501*a* or 501*b* may be a measured current value for the (N+1)th frame of the second image data IDATA2, which is increased from the reference value 503 by the N-th frame of the image frame IDATA1 when the (N+1)th frame of the second image data IDATA2 is output after the N-th frame that is included in the first image data IDATA1 is output.

In one or more embodiments, as the luminance value for the N-th frame increases, the measured current value for the (N+1)th frame of the second image data IDATA2 increases, so that the first current value 501*b* may be greater than the first current value 501*a*.

In one or more embodiments, the second current value 502*a* or 502*b* may be a current value according to a convolution operation between the filter (for example, the filter 310 of FIG. 4) generated based on the data for the N-th frame of the first image data IDATA1 and the data for the (N+1)th frame of the second image data IDATA2 when the (N+1)th frame of the second image data IDATA2 is output after the N-th frame of the first image data IDATA1 is output. In one example, a current value consumed by the (N+1)th frame of the second image data IDATA2 may be corrected by the convolution operation.

Referring to FIGS. 5A and 5B, as a luminance value of the N-th frame increases, a degree to which the current value, which is consumed by the (N+1)th frame of the second image data IDATA2, is corrected may be greater. In one example, the second current value 502*b* may have a corrected current value that is greater than that of the second current value 502*a*. In one example, at t=0, a difference between the first current value 501*b* and the second current value 502*b* may be greater than a difference between the first current value 501*a* and the second current value 502*a*.

Referring to FIG. 5A, the second current value 502*a* may include a first correction period T1, in which a difference from the first current value 501*a* is not constant, and may include a second correction period T2, in which the decrease in the current value is constant because a difference from the first current value 501*a* has a constant width.

Referring to FIG. 5B, the second current value 502*b* may include a first correction period T1' in which a difference from the first current value 501*b* is not constant and a second correction period T2' in which the decrease in the current value is constant because a difference from the first current value 501*b* has a constant width.

In one or more embodiments, the first correction period T1 or T1' may be a period from a time at which the current value for the (N+1)th frame starts to be overcorrected compared to the first current value 501*a* or 501 *b* to a time that a difference from the first current value 501*a* or 501*b* starts to become constant. The first correction period T1 or T1' may include a period in which the current value for the (N+1)th frame is overcorrected (or undershot).

In one or more embodiments, as the luminance value of the N-th frame of the first image data IDATA1 increases, a degree to which the current value for the (N+1)th frame of the second image data IDATA2 is corrected may be greater.

In one or more embodiments, the degree of overcorrection in the first correction period T1 may be expressed as a depth H1 of a concave portion that is overcorrected when compared to a section in which the current value for the (N+1)th frame is constantly decreased.

In one or more embodiments, the degree of overcorrection in the first correction period T1' may be expressed as a depth H2 of a concave portion that is overcorrected when compared to a section in which the current value for the (N+1)th frame is constantly decreased. In one example, the degree of overcorrection in the first correction period T1' may be greater than the degree of overcorrection in the first correction period T1 (e.g., H2 may be greater than H1).

In one or more embodiments, in a process of generating the filter (for example, the filter 310 of FIG. 4) based on the data for the N-th frame of the first image data IDATA1, as the parameter value that determines the degree to which the filter 310 corrects the current value of the (N+1)th frame of the second image data IDATA2 increases, the degree of overcorrection in the first correction period T1 or T1' may also increase.

In one or more embodiments, the parameter value may be set such that a difference between the second current value 502*a* or 502*b* and the reference value 503 in the second correction period T2 or T2' is included in a first range. For example, the first range may be about 1.5% or less of the reference value 503.

In one or more embodiments, when the grayscale value for the N-th frame of the first image data IDATA1 and the grayscale value for the (N+1)th frame of the second image data IDATA2 are the same, even when a convolution operation between the filter 310 based on the data for the N-th frame of the first image data IDATA1 and the data for the (N+1)th frame of the second image data IDATA2 is performed, because there is no change in the current value corresponding to the grayscale, the current value for the (N+1)th frame of the second image data IDATA2 might not be corrected.

Figure 6A:
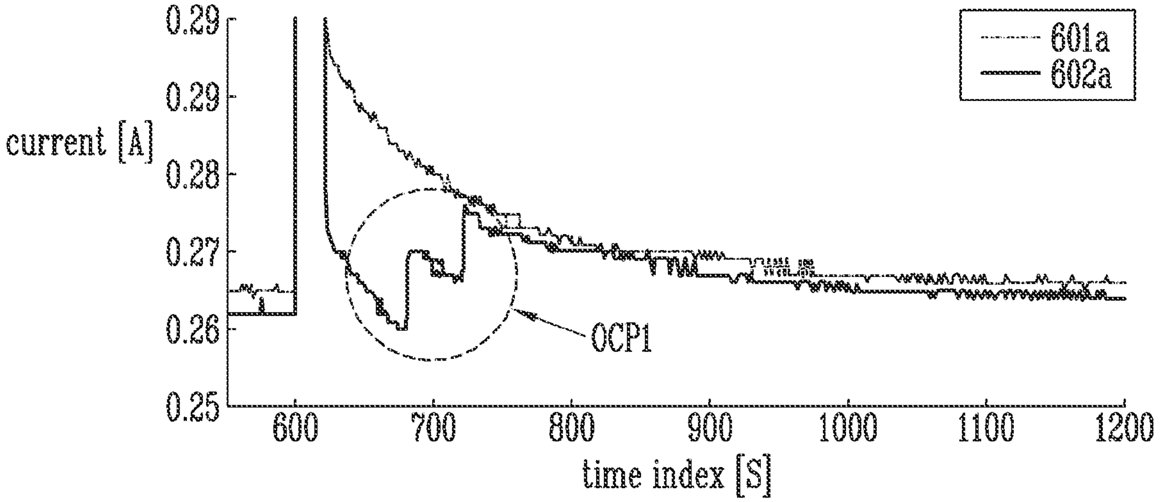
FIG. 6A is a diagram illustrating a corrected current value of the second image data according to the convolution operation.
Figure 6B:
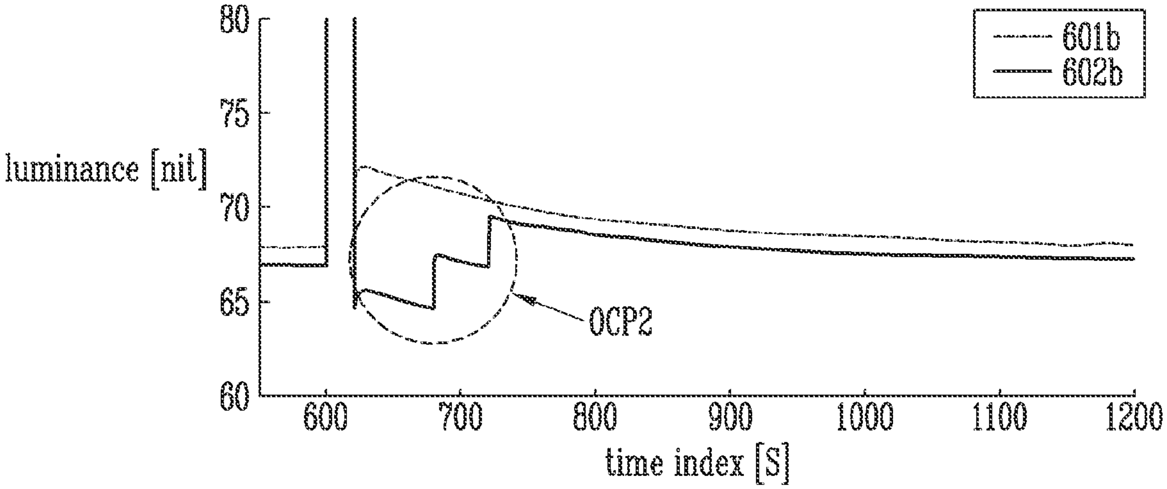
FIG. 6B is a diagram illustrating a luminance value of the second image data corresponding to the corrected current value of the second image data of FIG. 6A.

FIG. 6A is a diagram illustrating a corrected current value of the second image data IDATA2 according to the convolution operation. FIG. 6B is a diagram illustrating a luminance value of the second image data IDATA2 corresponding to the corrected current value of the second image data IDATA2 of FIG. 6A.

In FIG. 6A, it is assumed that the grayscale value of the N-th frame included in the first image data (for example, the first image data IDATA1) and the grayscale value of the (N+1)th frame of the second image data IDATA2 are different from each other.

In FIG. 6A, a first current value 601*a* may represent the current value of the (N+1)th frame of the second image data IDATA2 that is increased, due to the N-th frame of the first image data IDATA1 being output with a relatively high luminance, after the N-th frame of the first image data IDATA1 is output.

In FIG. 6B, a first luminance value 601*b* may represent a luminance value of the (N+1)th frame of the second image data IDATA2 according to the first current value 601*a*. The current of the (N+1)th frame of the second image data IDATA2 may increase due to the relatively high luminance value of the N-th frame of the first image data IDATA1, and the luminance value of the (N+1)th frame of the second image data IDATA2 may increase in response to the increased current value.

In FIG. 6A, a second current value 602*a* may represent the current value of the (N+1)th frame of the second image data IDATA2 in which the current value increased due to the N-th frame of the first image data IDATA1 being corrected according to the convolution operation between the filter (for example, the filter 310 of FIG. 4) based on the first image data IDATA1 after the N-th frame of the first image data IDATA1 is output, and based on the second image data IDATA2.

In FIG. 6B, a second luminance value 602*b* may represent the luminance value of the (N+1)th frame of the second image data IDATA2 according to the second current value 602*a*. The current value of the (N+1)th frame of the second image data IDATA2 increased due to the N-th frame of the first image data IDATA1 may be corrected according to the convolution operation. The luminance value of the (N+1)th frame of the second image data IDATA2 may be corrected in response to the corrected current value of the (N+1)th frame of the second image data IDATA2, and may be output as a luminance value that is lower than the first luminance value 601*b*.

In one or more embodiments, the second current value 602*a* may be a current value corrected according to the convolution operation, and may include a section (or overshot section) OCP1 in which the current value is overcorrected.

In one or more embodiments, corresponding to the overcorrected section OCP1 included in the second current value 602*a*, the second luminance value 602*b* may include a section OCP2 in which the luminance value is overcorrected and output.

Figure 7:
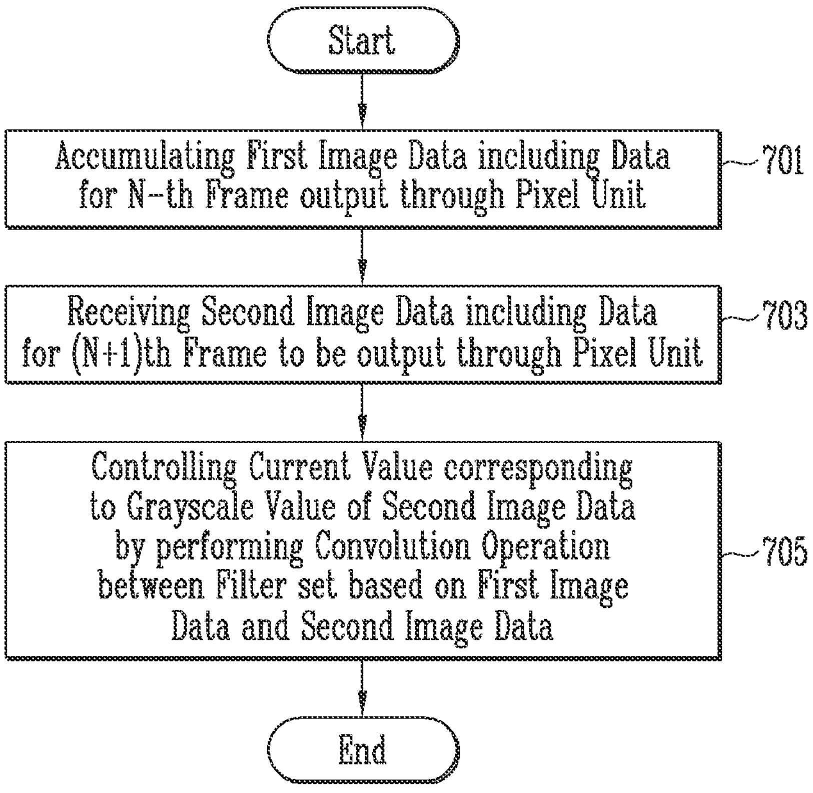
FIG. 7 is a flowchart for correcting a current value corresponding to the grayscale value of the second image data.

FIG. 7 is a flowchart for correcting a current value corresponding to the grayscale value of the second image data IDATA2.

According to a method for driving a display device according to one or more embodiments, in operation 701, first image data (for example, the first image data IDATA1 of FIG. 1) output through a display (for example, the display 100 of FIG. 1) may be accumulated.

In one or more embodiments, the first image data IDATA1 may include data for a previous frame including an N-th frame output through the display 100. The first image data IDATA1 may include data on a grayscale value for the previous frame including the N-th frame. The grayscale value for the previous frame including the N-th frame may include a grayscale value for each of a plurality of previous frames including the N-th frame.

In one or more embodiments, a data accumulator (for example, the data accumulator 500 of FIG. 2) may store the first image data IDATA1 including data for the N-th frame. The N-th frame may include a frame immediately preceding an (N+1)th frame, which is a frame to be output through the display 100.

According to the method for driving the display device according to one or more embodiments, in operation 703, second image data (for example, the second image data IDATA2 of FIG. 1) to be output through the display 100 may be received.

In one or more embodiments, the second image data IDATA2 may include data on a grayscale value of data output through the display 100.

In one or more embodiments, a data receiver (for example, the data receiver 400 of FIG. 2) may receive the second image data IDATA2 including data for the (N+1)th frame. The (N+1)th frame may include a frame occurring immediately after the N-th frame already output through the display 100.

According to the method for driving the display device according to one or more embodiments, in operation 705, a current value corresponding to the grayscale value of the second image data IDATA2 may be controlled through a convolution operation between a convolution filter (for example, the filter 310 of FIG. 4) that is set based on the first image data IDATA1 and the second image data IDATA2.

In one or more embodiments, an afterimage controller (for example, the afterimage controller 300 of FIG. 1) may generate input image data (for example, the input image data IDATA2_IRGB of FIG. 1) in which a current value corresponding to the grayscale value of the second image data IDATA2 is corrected through a convolution operation between the second image data IDATA2 and a filter 310, which has a size that is set based on the number of frames included in the first image data IDATA1, the filter 310 also being set according to a parameter value that determines a degree for controlling the current value of the second image data IDATA2.

In one or more embodiments, when the grayscale value of the N-th frame of the first image data IDATA1 is relatively higher than the grayscale value of the (N+1)th frame of the second image data IDATA2, a display device having high display quality can be provided by correcting the current value increased due to the (N+1)th frame of the second image data IDATA2 through the convolution operation.

In addition, unnecessary power consumption can be reduced by correcting the current value increased due to the (N+1)th frame of the second image data IDATA2 through the convolution operation.

In one or more embodiments, there can be solved a problem in that an afterimage is visually recognized due to an increase in luminance when the (N+1)th frame of the second image data IDATA2 is output due to an increase in a current value corresponding to the grayscale value included in the data for the (N+1)th frame of the second image data IDATA2.

According to the display device and the method for driving the same according to the embodiments of the present disclosure, it is possible to reduce or prevent an increase in current consumption in a current frame due to a previous frame and to reduce or prevent visual recognition of an afterimage.

In addition, it is possible to reduce unnecessary power consumption by reducing the current consumption in the current frame, which is increased due to the previous frame.

As described above, preferred embodiments of the present disclosure have been described with reference to the drawings. However, those skilled in the art will appreciate that various modifications and changes can be made to the present disclosure without departing from the spirit and scope of the present disclosure as set forth in the appended claims, with functional equivalents thereof to be included therein.

What is claimed is:

1. A display device comprising:
pixels arranged in a display;
a data accumulator for accumulating first image data for an N-th frame output through the display;
a data receiver for receiving second image data for an (N+1)th frame to be output through the display; and
an afterimage controller for correcting a current value corresponding to a grayscale value of the second image data through a convolution operation between a filter, which is set based on the first image data, and the second image data.

2. The display device of claim 1, wherein the first image data comprises a grayscale value of the N-th frame, and wherein the second image data comprises a grayscale value of the (N+1)th frame.

3. The display device of claim 2, wherein a size of the filter corresponds to a number of previous frames, which include the N-th frame, in the first image data, and
wherein the filter is set based on the first image data and based on a parameter value that determines a degree for correcting the current value corresponding to the grayscale value of the second image data.

4. The display device of claim 3, wherein data for the current value of the second image data corrected through the convolution operation corresponds to a first correction period comprising a section in which the current value is overcorrected, and corresponds to a second correction period distinct from the first correction period.

5. The display device of claim 4, wherein the first correction period becomes longer as the size of the filter increases.

6. The display device of claim 4, wherein a degree to which the current value is overcorrected in the first correction period is proportional to a magnitude of the parameter value.

7. The display device of claim 3, wherein a magnitude of the parameter value is set so that a difference between the current value of the second image data that is corrected and a reference current value, which corresponds to the grayscale value of the second image data, is in a first range.

8. The display device of claim 7, wherein the first range is less than or equal to about 1.5% of the reference current value.

9. The display device of claim 4, wherein, when the grayscale value of the first image data and the grayscale value of the second image data are the same, the data for the current value of the second image data corrected does not correspond to the first correction period and the second correction period.

10. The display device of claim 4, wherein the degree to which the current value is overcorrected in the first correction period increases as the grayscale value of the first image data increases.

11. A method for driving a display device comprising:
accumulating first image data for an N-th frame output through a display;
receiving second image data for an (N+1)th frame to be output through the display; and
controlling a current value corresponding to a grayscale value of the second image data by performing a convolution operation between a filter, which is set based on the first image data, and the second image data.

12. The method of claim 11, wherein the first image data comprises a grayscale value of the N-th frame, and wherein the second image data comprises a grayscale value of the (N+1)th frame.

13. The method of claim 12, further comprising setting the filter based on a number of frames, which include the N-th frame, in the first image data, based on the first image data, and based on a parameter value indicating a degree to which the current value is corrected in response to the grayscale value of the second image data.

14. The method of claim 13, further comprising setting the parameter value so that a difference between the current value of the second image data corrected, and a reference current value corresponding to the grayscale value of the second image data, is in a first range.

15. The method of claim 14, wherein the first range is less than or equal to about 1.5% of the reference current value.

16. The method of claim 13, wherein data for the current value of the second image data corrected corresponds to a first correction period comprising a section in which the current value is overcorrected, and a second correction period distinct from the first correction period.

17. The method of claim 16, wherein the first correction period becomes longer as a size of the filter increases.

18. The method of claim 16, wherein a magnitude of the parameter value is proportional to a degree to which the current value is overcorrected in the first correction period.

* * * * *